US006736384B2

(12) United States Patent
Yokota

(10) Patent No.: US 6,736,384 B2
(45) Date of Patent: May 18, 2004

(54) OPERATION DETECTING DEVICE OF CLAMP

(75) Inventor: Hideaki Yokota, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 10/346,649

(22) Filed: Jan. 17, 2003

(65) Prior Publication Data

US 2003/0151183 A1 Aug. 14, 2003

(30) Foreign Application Priority Data

Feb. 13, 2002 (JP) ....................................... 2002-034860
May 28, 2002 (JP) ....................................... 2002-153276

(51) Int. Cl.[7] .................................................. B23Q 3/08
(52) U.S. Cl. .............................. 269/32; 269/24; 269/27
(58) Field of Search .............................. 269/32, 24, 27, 269/20, 31, 93, 228

(56) References Cited

U.S. PATENT DOCUMENTS 3,572,216 A * 3/1971 Seesody ........................ 92/33
4,620,695 A * 11/1986 Vanistendael ................ 269/24
5,876,025 A * 3/1999 Yonezawa .................... 269/24
5,927,700 A 7/1999 Yonezawa
6,113,086 A * 9/2000 Yonezawa .................... 269/24

FOREIGN PATENT DOCUMENTS

JP 2001-87991 A 4/2001

* cited by examiner

*Primary Examiner*—Lee D. Wilson
(74) *Attorney, Agent, or Firm*—Akin Gump Strauss Hauer & Feld, L.L.P.

(57) ABSTRACT

A clamp rod (5) is vertically movably inserted into a housing (3). The housing (3) has a lower end wall (3*b*) formed with a detecting hole (58) substantially concentrically with an axis of the clamp rod (5). The detecting hole (58) has a peripheral surface opened to provide at least one inlet hole (71, 72) for supplying compressed air. A detecting member (62) is vertically movably fitted into the detecting hole (58). The detecting member (62) has an outer peripheral surface provided with a closing surface (68) which closes an opening portion (71*a*, 72*a*) of the inlet hole (71, 72) and with a recess (69) which communicates the opening portion (71*a*, 72*a*) with the outside air. The clamp rod (5) has a downwardly oriented projection (5*a*). The projection (5*a*) is connected to the detecting member (62) so that it can make a relative movement radially.

7 Claims, 8 Drawing Sheets

F I G. 1
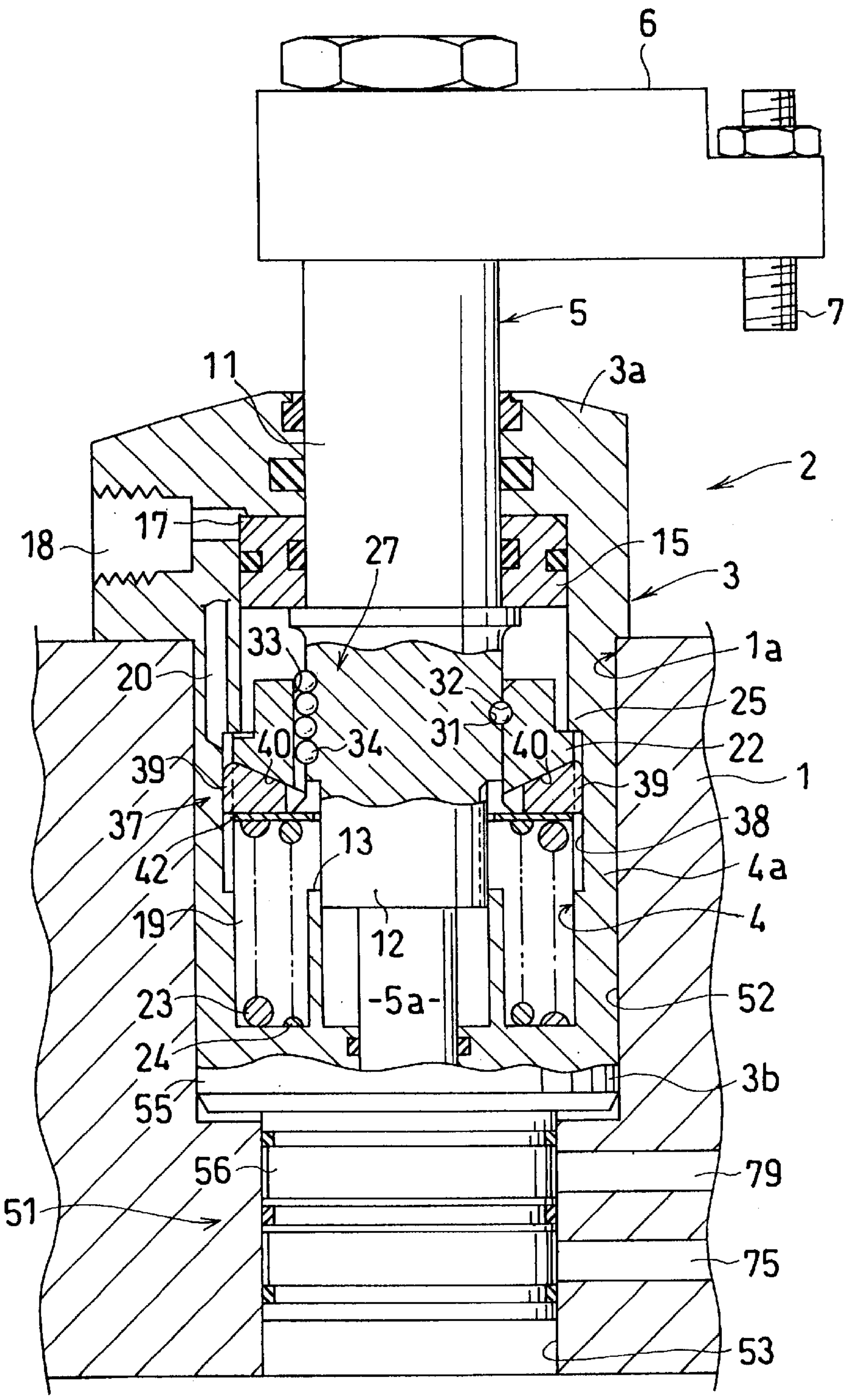

F I G. 5
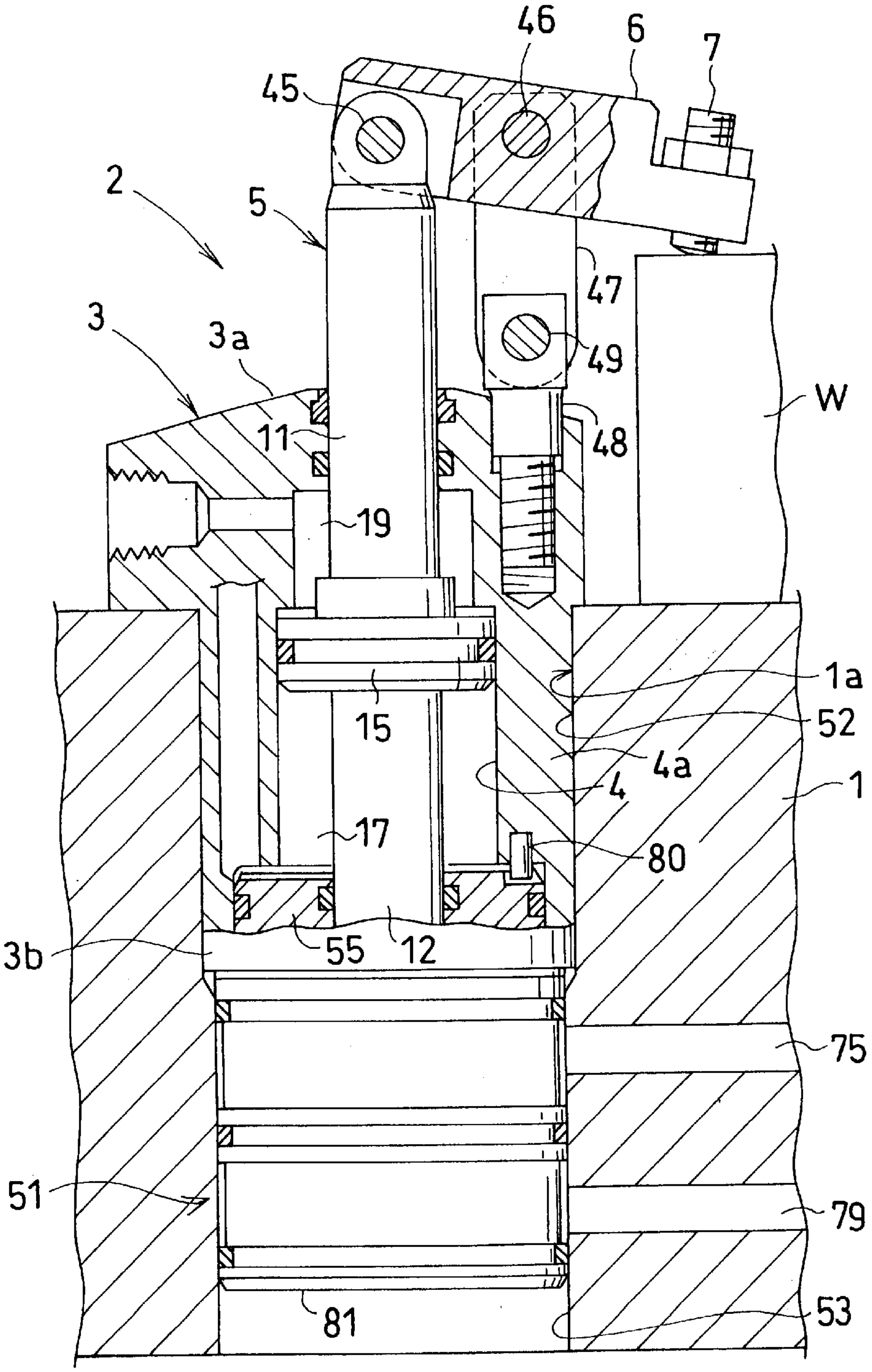

F I G. 7
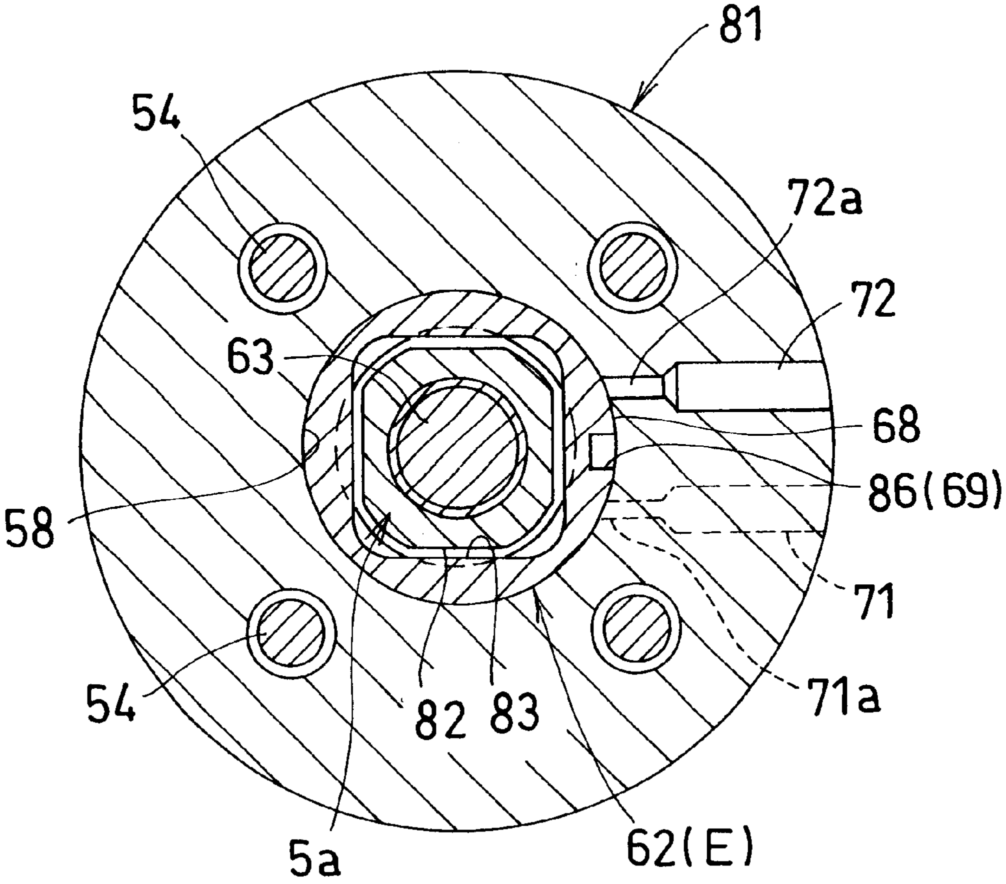

OPERATION DETECTING DEVICE OF CLAMP

BACKGROUND OF THE INVENTION

1. Field of the Invention

The present invention relates to a device for detecting an operation condition of a clamp which fixes a work or the like.

2. Explanation of Related Art

The operation detecting device of this kind projects a detecting rod from one end of a clamp rod to an area outside one end wall of a housing. A limit switch senses a moving condition of the detecting rod (for example, Japanese Patent Public Disclosure No. 2001-87991).

A clamp is used, for example, to fix a work of a machine tool. Therefore, the foregoing conventional technique had a problem that lots of cutting lubricant which is dispersed when machining shortens a service lifetime of the limit switch. Further, it had another problem that a large installation space is required for the limit switch.

SUMMARY OF THE INVENTION

The present invention has an object to provide a highly reliable and compact device for detecting an operation condition of a clamp.

In order to accomplish the above object, the present invention has constructed an operation detecting device of a clamp in the following manner, for example, as shown in FIGS. 1 to 4 or in FIGS. 5 to 9C.

A clamp rod 5 is inserted into a housing 3 axially movably. The housing 3 has one end wall 3*b* formed with a detecting hole 58 substantially concentrically with an axis of the clamp rod 5. The detecting hole 58 has a peripheral surface opened to provide at least one inlet hole 71 (72) for supplying pressurized fluid. A detecting member 62 is axially movably fitted into the detecting hole 58. The detecting member 62 has an outer peripheral surface provided with a closing surface 68 which closes an opening portion 71*a* (72*a*) of the inlet hole 71 (72) and with a recess 69 which communicates the opening portion 71*a* (72*a*) with the outside air. The clamp rod 5 has one end portion provided with an actuation portion 5*a*. The actuation portion 5*a* is connected to the detecting member 62 so that it can make a relative movement radially.

The present invention offers the following function and advantages.

When detecting an operation of the clamp, pressurized fluid such as compressed air is supplied to the inlet hole. In the case where the opening portion of the inlet hole faces the recess of the detecting member, the pressurized fluid which has been supplied to the inlet hole is discharged to an exterior area through the recess to result in lowering a pressure of the pressurized fluid than a set pressure. On the other hand, in the event the inlet hole has the opening portion closed by the closing surface of the detecting member, the pressurized fluid is prevented from being discharged to result in retaining the set pressure.

In consequence, it is possible to detect which condition the detecting member is switched over to by detecting the pressure of the pressurized fluid. This makes it possible to detect the operation condition of the clamp rod.

As mentioned above, the operation detecting device of the present invention utilizes the pressurized fluid such as compressed air. Therefore, differently from the limit switch or the like of the above-mentioned conventional technique, it is inhibited from deteriorating due to cutting lubricant or the like to result in having its service lifetime extended and its reliability enhanced. In addition, the operation detecting device can be provided in one end wall of the housing and therefore can be made compact.

Further, the present invention connects the actuation portion provided at one end portion of the clamp rod and the detecting member to each other so that they can make a relative movement radially. Accordingly, it offers the following advantages.

The above arrangement absorbs misalignment of the axis of the clamp rod with an axis of the detecting hole, thereby enabling the detecting member to be smoothly inserted into the detecting hole.

Moreover, in the case where a large bending moment has acted on the clamp rod at the time of clamp driving, there is a likelihood that the actuation portion provided on the clamp rod bends although only slightly. In this case, the bent actuation portion makes a relative movement radially with respect to the detecting member, thereby making it possible to prevent the detecting member from being pushed to the detecting hole. Thus the detecting member smoothly moves through the detecting hole to result in the possibility of detecting the operation of the clamp assuredly and precisely.

The present invention includes a device wherein the actuation portion 5*a* is connected to the detecting member 62 so that it can make a relative movement axially. In this case, since the bent actuation portion can be surely prevented from pushing the detecting member to the detecting hole, it is possible to detect the operation of the clamp more precisely.

The present invention further includes a device wherein the actuation portion 5*a* is connected to the detecting member 62 in such a state that the former is prevented from making a relative rotation around the axis. In this case, it is possible to retain the detecting member at substantially a constant posture. This can decrease an area occupied by the recess, of an area of the outer peripheral surface of the detecting member. Therefore, a guiding area of the detecting member with respect to the detecting hole increases to result in being able to smoothly move the detecting member.

The present invention still more includes the following device.

In this device, the detecting hole 58 has one end communicated with the outside air. The recess 69 of the detecting member 62 is defined by a groove extending axially. The recess 69 composed of the groove has one end opened to one end surface of the detecting member 62 and has the other end opened to the other end surface of the detecting member 62. According to this invention, it is possible to provide a detecting device which has a simple structure and a high reliability.

BRIEF DESCRIPTION OF THE DRAWINGS

FIGS. 1 to 4 show a first embodiment of the present invention;

FIG. 1 is a partial sectional view when seen in elevation of a rotary clamp;

FIG. 3 is an enlarged sectional view when seen along a line III—III in FIG. 2A in a direction indicated by arrows and is a view which shows a detecting member under a rotated and retreated condition;

FIG. 4 is similar to FIG. 3 and shows the detecting member ready for clamping;

FIGS. 5 to 9C show a second embodiment of the present invention;

FIG. 5 is a partial sectional view when seen in elevation of a link-type clamp and is similar to FIG. 1;

FIG. 6 is a sectional view of an operation detecting device provided in the link-type clamp under an unclamping condition;

FIG. 7 is a sectional view when seen along a line VII—VII in FIG. 6 in a direction indicated by arrows;

FIG. 9C is a view corresponding to a sectional view when seen along a line 9C—9C in FIG. 8A in a direction indicated by arrows.

DESCRIPTION OF THE PREFERRED EMBODIMENTS

Figures 2A, 2B:
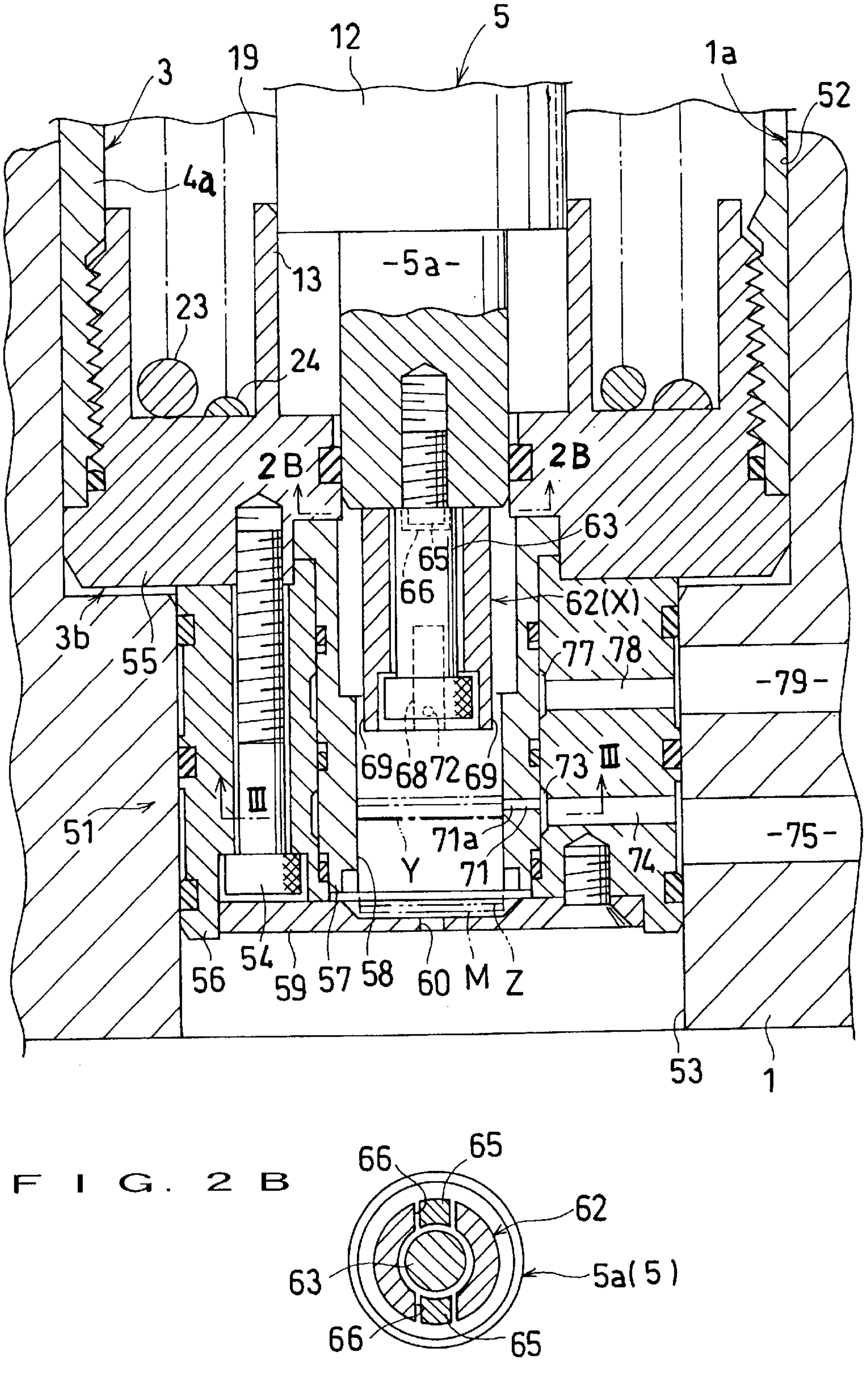
FIG. 2A is a sectional view of an operation detecting device provided in the rotary clamp.
FIG. 2B is a sectional view when seen along a line 2B—2B in FIG. 2A in a direction indicated by arrows.

FIGS. 1 to 4 show a first embodiment of the present invention and exemplifies a case where the present invention is applied to a rotary clamp. First, an explanation is given for a whole structure of the clamp by resorting to a partial sectional view when seen in elevation of FIG. 1.

A housing 3 of the clamp 2 is inserted into an attaching bore 1*a* of a table 1 of a machine tool. The housing 3 is fixed to an upper surface of the table 1 through a plurality of bolts (not shown). The housing 3 has a cylindrical hole 4 into which a clamp rod 5 is inserted. The clamp rod 5 has an upper end portion from which an arm 6 projects radially and outwardly. The arm 6 has a leading end portion to which a push bolt 7 is secured.

The housing 3 has an upper end wall 3*a* which supports an upper slide portion 11 of the clamp rod 5 slidably and hermetically. Further, the housing 3 has a lower end wall (one end wall) 3*b* provided with a guide cylinder 13. The guide cylinder 13 supports a lower slide portion 12 of the clamp rod 5 slidably.

A means for driving the clamp rod 5 is constructed as follows.

An annular piston 15 is externally fitted onto the clamp rod 5 hermetically between the upper slide portion 11 and the lower slide portion 12. The piston 15 is inserted into the cylindrical hole 4 hermetically. Here the piston 15 is formed separately from the clamp rod 5. However, instead, the piston 15 may be formed integrally with the clamp rod 5.

A clamping chamber 17 is formed between the upper end wall 3*a* and the piston 15. Pressurized oil can be supplied to and discharged from the clamping chamber 17 through a clamping pressurized oil supply and discharge port 18. And also an unclamping chamber 19 is formed between the lower end wall 3*b* and the piston 15. The pressurized oil can be supplied to and discharged from the unclamping chamber 19 through an unclamping pressurized oil supply and discharge port (not shown) and an oil passage 20.

Within the unclamping chamber 19, a sleeve 22 for rotating operation is inserted into an annular space defined between an outer peripheral surface of the clamp rod 5 and the cylindrical hole 4. The sleeve 22 is urged upwards by two push springs 23, 24. A stepped wall 25 for stopping inhibits the sleeve 22 from moving upwards over a predetermined distance.

A converting mechanism 27 is provided over the outer peripheral surface of the clamp rod 5 and an inner peripheral surface of the sleeve 22. The converting mechanism 27 converts an axial reciprocal movement of the clamp rod 5 to a rotary movement. Here it is constructed in the following manner as disclosed in U.S. Pat. No. 5,927,700.

The clamp rod 5 has the outer peripheral surface formed in its entirety with first concaved passages 31 which communicate with one another in the shape of saw teeth. The first concaved passage 31 comprises two first helical grooves (not shown) in the shape of a double-start thread, formed by one pitch. One of the first helical grooves has a terminal end communicated with a beginning end of the other helical groove through a communication groove. The other first helical groove has a terminal end communicated with a beginning end of the one helical groove through another communication groove. Further, the sleeve 22 has the inner peripheral surface formed in its entirety with second concaved passages 32 which communicate with each other peripherally. The second concaved passage 32 comprises two second helical grooves (not shown) which correspond to the first helical grooves and are spaced apart from each other peripherally at a predetermined interval, and two relief grooves 33 which correspond to the communication grooves and are formed so as to extend peripherally. In FIG. 1, only one of the two relief grooves 33 is illustrated. And a large number of rolling balls 34 are charged into spaces defined between the first concaved passages 31 and the second concaved passages 32.

A torque limiter 37 is provided between a peripheral wall 4*a* of the cylindrical hole 4 and the sleeve 22. The torque limiter 37 inhibits the sleeve 22 from rotating with respect to the peripheral wall 4*a* when a torque which acts from the clamp rod 5 to the sleeve 22 via the converting mechanism 27 does not exceed a set value. On the other hand, the torque limiter 37 allows the sleeve 22 to rotate with respect to the peripheral wall 4*a* when the torque has exceeded the set value.

Speaking it in more detail, the torque limiter 37 is constructed as follows.

The peripheral wall 4*a* of the cylindrical hole 4 is provided with arcuate linear guide grooves 38, 38 extending vertically so that they oppose to each other. Two engaging members 39, 39 which engage with the two linear guide grooves 38, 38 are inserted into the sleeve 22. Each of the engaging members 39 is formed from a wedge member whose height increases as it goes radially outwards and makes a tapering engagement with a tapered surface 40 of the sleeve 22. Thus the two engaging members 39, 39 are supported by the sleeve 22 so that they are radially movable but are inhibited from moving peripherally.

The engaging members 39, 39 have under surfaces to which spring retainers 42 are attached. And the push springs 23, 24 have lower ends received by the lower end wall 3*b* of the housing 3 and have upper ends received by the spring retainers 42. This allows urging forces of the push springs 23, 24 to push the engaging members 39 radially outwards through the tapered surfaces 40 and fit arcuate engaging projections of the thus pushed engaging members 39 into the linear guide grooves 38.

The clamp 2 operates as follows.

Under a rotated and retreated condition in FIG. 1, pressurized oil in the clamping chamber 17 is discharged and pressurized oil is supplied to the unclamping chamber 19. Therefore, the piston 15 ascends by a pressure which acts on its annular sectional area and the clamp rod 5 ascends by a pressure which acts on its sealing sectional area. The push springs 23, 24 bring the sleeve 22 into contact with the stepped wall 25.

When switching over the clamp 2 under the rotated and retreated condition to a clamping condition, the pressurized oil in the unclamping chamber 19 is discharged and pressurized oil is supplied to the clamping chamber 17.

Then the piston 15 pushes down the clamp rod 5. The clamp rod 5 descends while rotating in a counter-clockwise direction when seen from bottom with respect to the sleeve 22 which is inhibited from rotating by the linear guide grooves 38. At this clamp rotation time, the rolling balls 34 circulate peripherally while rolling along the first concaved passages 31 and the second concaved passages 32. This reduces a frictional resistance at the clamp rotation time to result in smoothly rotating the clamp rod 5. Subsequently, the piston 15 straightly lowers the clamp rod 5 and the sleeve 22 along the linear guide grooves 38 to switch over the clamp rod 5 to a clamping position (not shown).

When switching over the clamp 2 from the clamping condition to the rotated and retreated condition in FIG. 1, the pressurized oil in the clamping chamber 17 is discharged and the pressurized oil is supplied to the unclamping chamber 19. Then a pressure of the pressurized oil and urging forces of the push springs 23, 24 straightly raise the clamp rod 5 and the sleeve 22 along the linear guide grooves 38. The sleeve 22 is received by the stepped wall 25. Subsequently, the clamp rod 5 moves upwards by the pressure of the pressurized oil with respect to the sleeve 22 inhibited from ascending by the stepped wall 25. Thus the clamp rod 5 ascends while rotating in a clockwise direction when seen from bottom and is switched over to a rotation and retreat position in FIG. 1.

When a torque which acts from the clamp rod 5 to the sleeve 22 through the converting mechanism 27 does not exceed a set value at the clamp rotation time or the retreat and rotation time, an engagement locking force exerted by the urging forces of the push springs 23, 24 is larger than a tangential force which acts on an outer peripheral surface of the engaging projection of the engaging member 39. This, as shown in FIG. 1, maintains the engaging projection of the engaging member 39 fitted into the linear guide groove 38 and inhibits the sleeve 22 from rotating with respect to the peripheral wall 4*a* of the cylindrical hole 4.

On the other hand, when the toque has exceeded the set value for any reason, the tangential force which acts on the outer peripheral surface of the engaging projection of the engaging member 39 becomes larger than the engagement locking force exerted by the urging forces of the push springs 23, 24. This enables the engaging members 39 to move radially inwards along the tapered surfaces 40 against the urging forces and cancels a fitting condition between the engaging projections of the engaging members 39 and the linear guide grooves 38, thereby allowing the sleeve 22 to rotate with respect to the peripheral wall 4*a*. As a result, an excessive torque of the clamp rod 5 does not act on the converting mechanism 27 and the sleeve 22.

In consequence, it is possible to assuredly prevent the rolling balls 34 and the like constituent members of the converting mechanism 27 from being damaged by the excessive torque.

Figure 3:
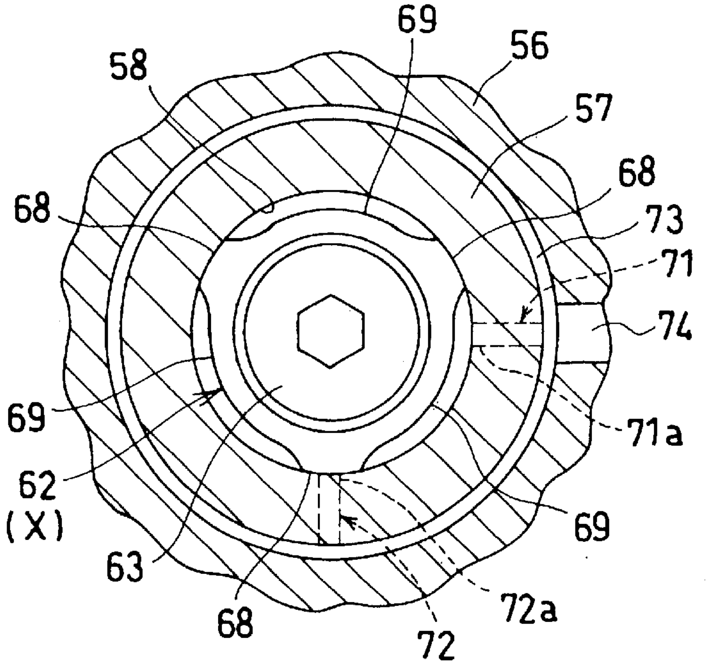
Figure 4:
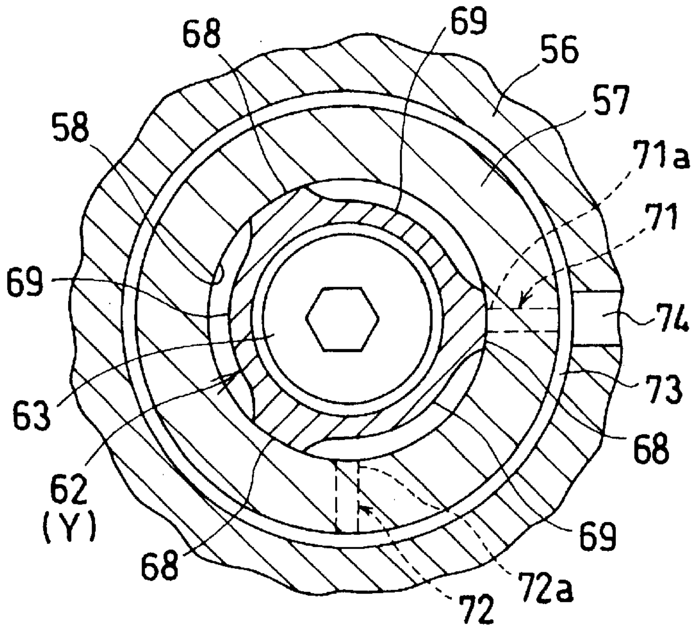

There is provided a device for detecting an operation condition of the clamp 2 constructed as above. The operation detecting device 51 is explained by relying on FIG. 2A, FIG. 2B, FIG. 3 and FIG. 4 with reference to FIG. 1. FIG. 2A is a sectional view of the operation detecting device 51. FIG. 2B is a sectional view when seen along a line 2B—2B in FIG. 2A in a direction indicated by arrows. FIG. 3 is an enlarged sectional view when seen along a line III—III in FIG. 2A in a direction indicated by arrows and shows a rotated and retreated condition of a detecting rod (detecting member) 62 to be mentioned later. FIG. 4 is similar to FIG. 3 and shows the detecting rod 62 ready for clamping.

The attaching bore la of the table 1 comprises a larger-diameter bore 52 and a smaller-diameter bore 53 which are vertically formed in the mentioned order. The lower end wall (one end wall) 3*b* of the housing 3 comprises a closure member 55 attached to the peripheral wall 4*a* hermetically in screw-thread engagement, an outer cylinder 56 fixed to the closure member 55 through a plurality of bolts 54 (only one of which is illustrated here) and an inner cylinder 57 which is inserted into the outer cylinder 56 and is pushed and fixed to the closure member 55.

The outer cylinder 56 is inserted into the smaller-diameter bore 53 hermetically. The inner cylinder 57 is arranged substantially concentrically with an axis of the clamp rod 5. A lower half portion of an inner peripheral surface of the inner cylinder 57 forms a detecting hole 58. The detecting hole 58 has a lower end communicated with the outside air through an outlet hole 60 of a cover plate 59.

The clamp rod 5 has a downwardly oriented projection (actuation portion) 5*a* which is hermetically inserted into the closure member 55. The projection 5*a* has a lower portion connected through a support bolt 63 to a cylindrical detecting rod (detecting member) 62 in such a state that it can make a relative movement radially and vertically but is inhibited from making a relative rotation around the axis. Speaking it in more detail, the projection 5*a* has an under surface provided with two projections 65 which oppose to each other. Grooves 66 provided in an upper surface of the detecting rod 62 are externally fitted onto these projections 65 with a predetermined gap interposed therebetween. The detecting rod 62 has a cylindrical hole into which the support bolt 63 is inserted with a predetermined radial gap interposed therebetween. Additionally, the detecting rod 62 is slightly movable in a vertical direction between an under surface of the projection 5*a* and a lower portion of the support bolt 63.

Mainly as shown in FIG. 3, the detecting rod 62 has an outer peripheral surface provided at its lower half portion with three vertically extending closing surfaces 68 and three vertically extending recesses 69. The closing surfaces 68 are peripherally spaced apart from each other at substantially the same interval as well as the recesses 69. The recess 69 is defined by a groove. The recess 69 has a lower end opened to a lower end surface of the detecting rod 62 and has an upper end opened to an upper end surface of the detecting rod 62. The detecting rod 62 is inserted into the detecting hole 58 vertically movably and rotatably around the axis.

The detecting hole 58 of the inner cylinder 57 is opened to provide a first inlet hole 71 for detecting the clamping condition and a second inlet hole 72 for detecting the rotated and retreated condition, which are spaced apart from each other vertically and are arranged peripherally with an angle of about 90 degrees interposed therebetween. The first inlet hole 71 is connected to a supply source (not shown) of compressed air via a first peripheral groove 73 and a first through hole 74 of the outer cylinder 56, and a first supply hole 75 of the table 1 in the mentioned order. Further, the second inlet hole 72 is also connected to the supply source of the compressed air via a second peripheral groove 77 and a second through hole 78 of the outer cylinder 56, and a second supply hole 79 of the table 1 in the mentioned order.

The operation detecting device 51 constructed as above works as follows.

The detecting rod 62 rotates interlockingly with the movement of the clamp rod 5, from a rotation and retreat position (X) indicated by a full line in FIG. 2A (and FIG. 3) to a position (Y) ready for clamping, indicated by a bold chain line in FIG. 2A (and FIG. 4). Thereafter, it goes straight to a clamping position (Z) indicated by a two-dot chain line in FIG. 2A. Speaking it in more detail, it is as follows.

When the clamp rod 5 is under the rotated and retreated condition, as shown by the full-line view in FIG. 2A and FIG. 3, the detecting rod 62 comes to the rotation and retreat position (X). One of the three closing surfaces 68 of the detecting rod 62 closes a second opening portion 72 of the second inlet hole 72. This retains a pressure of the compressed air which has been supplied to the second supply hole 79 at a set pressure, thereby allowing a second pressure switch (not shown) communicated with the second supply hole 79 to sense that the detecting rod 62 is at the rotation and retreat position (X).

When the clamp 2 is driven for clamping, first, the detecting rod 62 descends while rotating in a counter-clockwise direction when seen from bottom and tries to switch over from the rotation and retreat position (X) to the position (Y) ready for clamping.

While the detecting rod 62 is rotating before it switches over to the position (Y), the recess 69 overlaps the opening portion 71*a* of the first inlet hole 71 when seen from bottom. Therefore, the compressed air which has been supplied to the first supply hole 75 is discharged to an exterior area through the first opening portion 71*a* of the first inlet hole 71, the recess 69 and the outlet hole 60. This lowers the pressure of the first supply hole 75 than the set pressure, thereby allowing a first pressure switch (not shown) communicated with the first supply port 75 to sense that the detecting rod 62 is rotating.

And when the detecting rod 62 descends to the position (Y) while rotating, as shown by the view indicated by the bold chain line in FIG. 2A and FIG. 4, the closing surface 68 has its lower end made lower than the first opening portion 71*a* and closes the first opening portion 71*a*. This retains the pressure of the compressed air which has been supplied to the first supply hole 75 at the set pressure, thereby allowing the first pressure switch (not shown) communicated with the first supply hole 75 to sense that the detecting rod 62 has come to the position (Y) ready for clamping.

Next, the detecting rod 62 at the position (Y) goes down straightly to the clamping position (Z). At this clamping position (Z), as shown by the view indicated by the two-dot chain line in FIG. 2A (and FIG. 4), the closing surface 68 has its upper end maintained higher than the first opening portion 71*a* and keeps the first opening portion 71*a* closed. This retains the pressure of the compressed air which has been supplied to the first supply hole 75 at the set pressure, thereby allowing the first pressure switch (not shown) to sense that the detecting rod 62 is at the clamping position (Z). A clamping zone is sufficient if it extends between the position (Y) and the position (Z).

In the case where the clamp 2 has been driven for clamping with a work or the like of a fixed object unattached to the table 1, the detecting rod 62 descends to a vain-clamping position (M) lower than the clamping position (Z) and, as shown by a view indicated by a thin chain line in FIG. 2A, the closing surface 68 has its upper end made lower than the first opening portion 71*a*. Thus the compressed air which has been supplied to the first supply hole 75 is discharged to the exterior area through the first opening portion 71*a*, the recess 69 and the outlet hole 60. This lowers the pressure of the first supply hole 75 than the set pressure, thereby allowing the first pressure switch (not shown) communicated with the first supply hole 75 to sense that the detecting rod 62 is at the vain-clamping position (M).

In the first embodiment, when the detecting rod 62 has descended while rotating to the position (Y) ready for clamping, the closing surface 68 closes the first opening portion 71*a*. However, instead, when the detecting rod 62 has descended into the clamping zone below the position (Y), the closing surface 68 may close the first opening portion 71*a*.

The first embodiment can be modified as follows.

A rotation angle of the clamp rod 5 is not limited to 90 degrees. For instance, it may be changed to 60 degrees, 45 degrees and the like. In this case, it is sufficient if the inlet hole 71 is installed at a position changed in correspondence with the changed rotation angle. The clamp rod 5 may rotate in a direction reverse to those in the foregoing respective embodiments.

A push means of the converting mechanism 27 may be composed of rubber or the like resilient member instead of the exemplified push springs 23, 24.

The converting mechanism 27 is satisfactory if it converts the axial movement of the clamp rod 5 to the rotary movement of the clamp rod 5. Therefore, various sorts of mechanisms are considered instead of the exemplified mechanism. For example, the clamp rod 5 has its outer peripheral surface formed with a cam groove of a predetermined length. A ball or the like operation member attached to the sleeve 22 is fitted into the cam groove.

The clamp 2 may be clamp driven after having rotated at a horizontal position instead of being clamp driven after it has descended while rotating. Further, the torque limiter 37 may be omitted.

FIGS. 5 to 9C show a second embodiment. In this second embodiment, the same members as the constituent members in the first embodiment are, in principle, designated by the same reference characters or numerals for explanation.

This second embodiment exemplifies a case where the operation detecting device of the present invention is applied to a clamp of link-type and is different from the first embodiment on the following points.

First, an explanation is given for a structure of the link-type clamp 2 by resorting to a sectional view when seen in elevation of FIG. 5.

A left portion in a longitudinal direction of the arm 6 is connected to an upper portion of the clamp rod 5 through a first pin 45 so as to be swingable in a vertical plane. The arm 6 has a halfway portion in the longitudinal direction. The halfway portion is swingably connected through a second pin 46 to upper portions of a pair of link members 47 (only one of which is illustrated here). In addition, the paired link members 47 have lower portions swingably connected through a third pin 49 to a head portion of a bolt 48 which engages with the upper end wall 3a of the housing 3 in screw-thread fitting relationship.

Besides, the clamp rod 5 has a halfway height portion to which the piston 15 is secured. The clamping chamber 17 is formed below the piston 15 and the unclamping chamber 19 is formed above the piston 15.

The link-type clamp 2 operates as follows.

When it is clamped as shown in FIG. 5, pressurized oil in the unclamping chamber 19 is discharged and pressurized oil is supplied to the clamping chamber 17. Thus the clamp rod 5 ascends to drive the arm 6 in the clockwise direction around the second pin 46 and the push bolt 7 provided at a right portion of the arm 6 pushes a work (W) downwards.

Conversely, when it is unclamped, the pressurized oil in the clamping chamber 17 is discharged and the pressurized oil is supplied to the unclamping chamber 19. Then the clamp rod 5 descends to retreat the arm 6 in the counter-clockwise direction.

Figure 6:
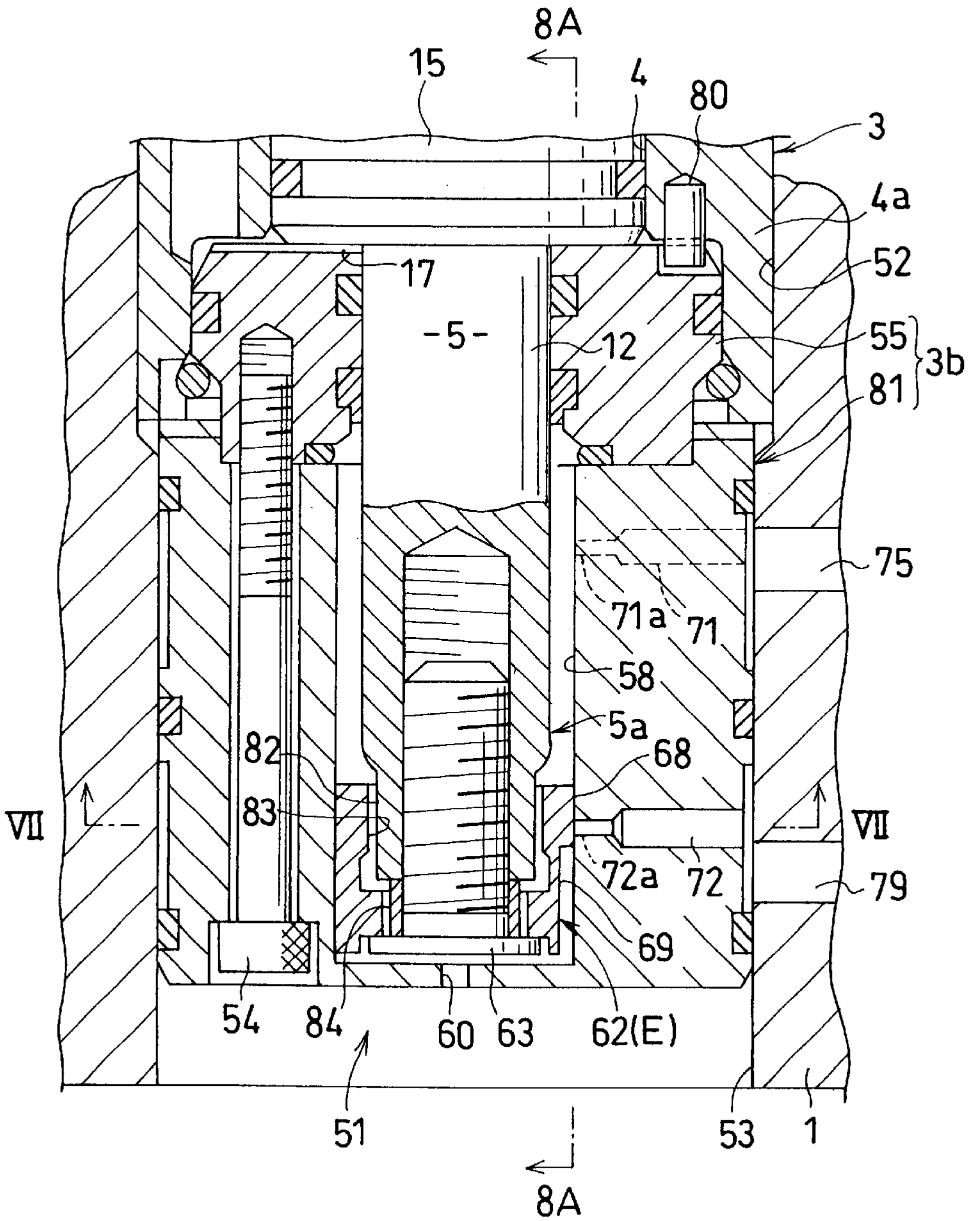
Figures 8A, 8B, 8C:
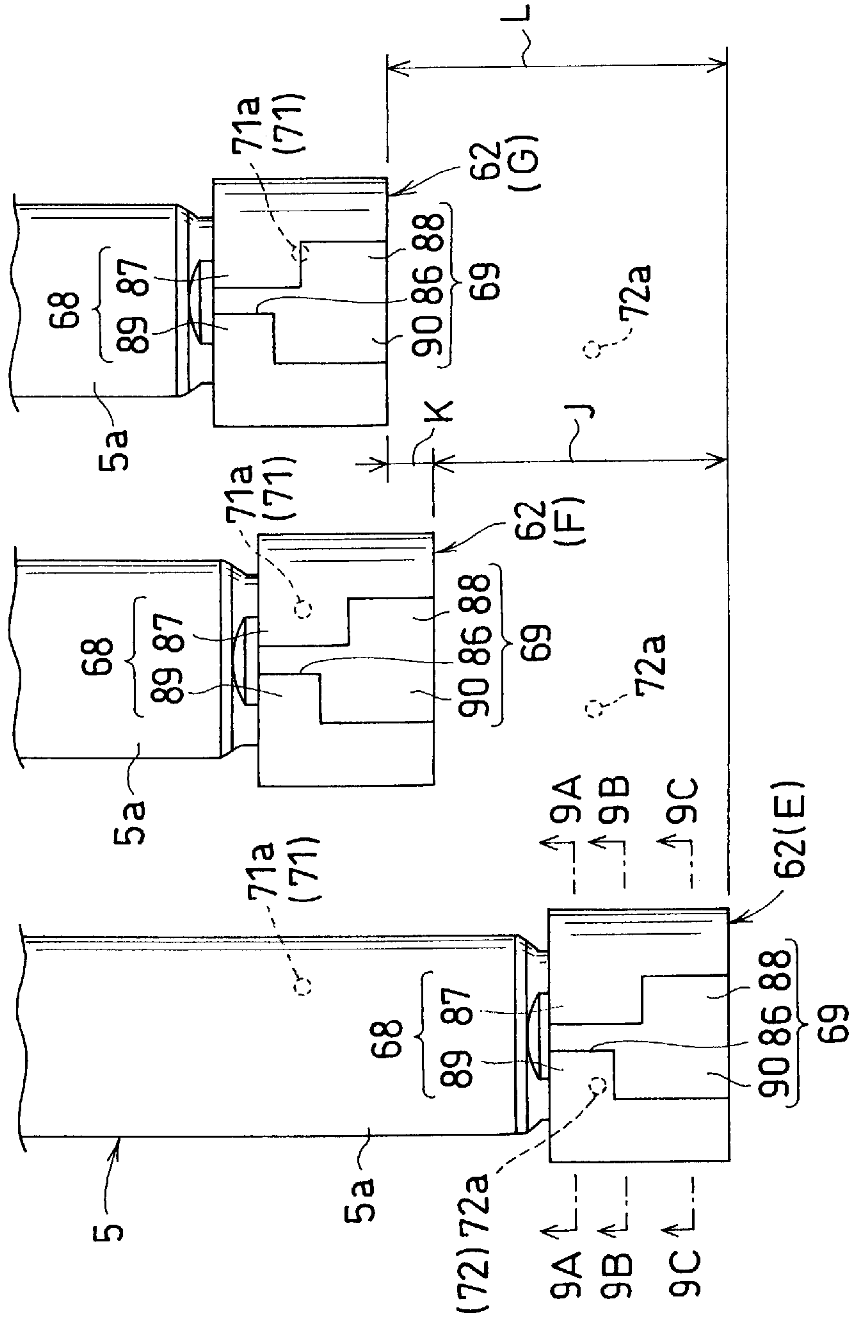
FIG. 8A is a view corresponding to a view when seen along a line 8A—8A in FIG. 6 in a direction indicated by arrows and shows the detecting member unclamped.
FIG. 8B shows the detecting member clamped and is similar to FIG. 8A.
FIG. 8C shows the detecting member vain-clamped and is similar to FIG. 8A.
Figure 9A:
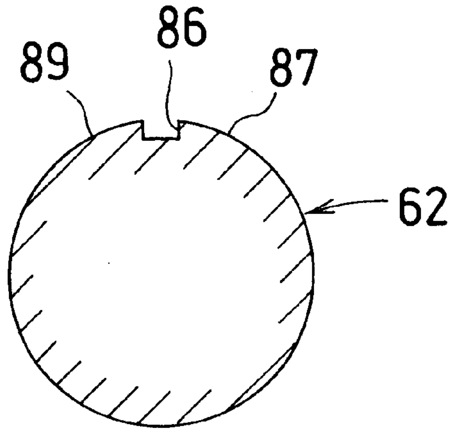
FIG. 9A is a view corresponding to a sectional view when seen along a line 9A—9A in FIG. 8A in a direction indicated by arrow.
Figure 9B:
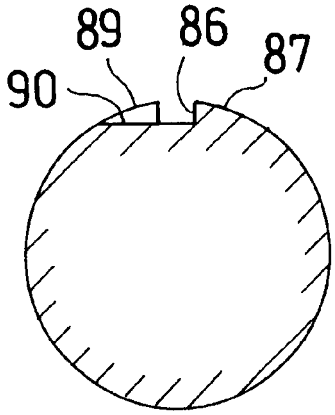
FIG. 9B is a view corresponding to a sectional view when seen along a line 9B—9B in FIG. 8A in a direction indicated by arrows.
Figure 9C:
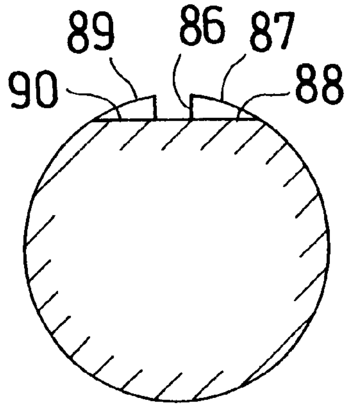

Next, an explanation is given for a structure of the operation detecting device 51 by relying on FIG. 6 to FIGS. 9A, 9B and 9C. FIG. 6 is a sectional view of the operation detecting device 51 under the unclamping condition. FIG. 7 is a sectional view when seen along a line VII—VII in FIG. 6 in a direction indicated by arrows. FIG. 8A is a view corresponding to a view when seen along a line 8A—8A in FIG. 6 in a direction indicated by arrows and shows the detecting member 62 unclamped. FIG. 8B shows the detecting member 62 clamped and is similar to FIG. 8A. FIG. 8C shows the detecting member 62 vain-clamped and is similar to FIG. 8A. FIG. 9A is a view corresponding to a sectional view when seen along a line 9A—9A in FIG. 8A in a direction indicated by arrows. FIG. 9B is a view corresponding to a sectional view when seen along a line 9B—9B in FIG. 8A in a direction indicated by arrows. FIG. 9C is a view corresponding to a sectional view when seen along a line 9C—9C in FIG. 8A in a direction indicated by arrows.

The lower end wall (one end wall) 3b of the housing 3 comprises the closure member 55 hermetically inserted into the peripheral wall 4a and a cylinder member 81 fixed to the closure member 55 through a plurality of bolts 54. The closure member 55 is prevented from rotating by a pin 80. The cylinder member 81 is hermetically inserted into the smaller-diameter bore 53. The cylinder member 81 is arranged substantially concentrically with the axis of the clamp rod 5. An inner peripheral surface of the cylinder member 81 defines the detecting hole 58. The lower end of the detecting hole 58 communicates with the outside air through the outlet hole 60.

The clamp rod 5 has the lower slide portion 12 inserted into the closure member 55 hermetically. The downward projection (actuation portion) 5a of the clamp rod 5 has a lower portion connected through the support bolt 63 to the cylindrical detecting member 62 so that the lower portion can make a relative movement radially and vertically but is inhibited from making a relative rotation around the axis. The detecting member 62 is vertically movably fitted into the detecting hole 58.

More specifically, mainly as shown in FIG. 7, the projection 5a has the lower portion formed with an outer peripheral surface 82 in the shape of a square as well as the detecting member 62 is formed with a cylindrical hole 83 in the shape of a square. The square cylindrical hole 83 is externally fitted onto the square outer peripheral surface 82 with a predetermined gap interposed therebetween. The detecting member 62 is vertically movable between a lower portion of the support bolt 63 inserted into the cylindrical hole 83 of the detecting member 62 and an under surface of the projection 5a. Numeral 84 designates a spacer.

Mainly as shown in FIG. 8A to FIG. 8C and in FIG. 9A to FIG. 9C, the detecting member 62 has the outer peripheral surface provided with the closing surface 68 and the recess 69.

More specifically, the detecting member 62 has vertical opposite end surfaces opened to provide a communication groove 86. The communication groove 86 has one outer side (right outer side in FIG. 8A) vertically formed with a first closing surface 87 for detecting the clamping condition and with a first relief groove 88, and has the other outer side (left outer side in FIG. 8A) vertically formed with a second closing surface 89 for detecting the unclamping condition and with a second relief groove 90. The first closing surface 87 and the second closing surface 89 define the closing surface 68. The communication groove 86, the first relief groove 88 and the second relief groove 90 form the recess 69.

The detecting hole 58 is opened to provide the first inlet hole 71 for detecting the clamping condition and the second inlet hole 72 for detecting the unclamping condition with a predetermined spacing interposed vertically as well as horizontally (see FIGS. 6 and 7). The first inlet hole 71 is connected to a supply source (not shown) of compressed air via the first supply hole 75 of the table 1. The second inlet hole 72 is also connected to the supply source of the compressed air via the second supply hole 79 of the table 1.

The operation detecting device 51 of the foregoing construction works as follows.

When the clamp rod 5 is under the unclamping condition, as shown in FIGS. 6 and 8A, the detecting member 62 comes to an unclamping position (E). The second closing surface 89 of the detecting member 62 closes the second opening portion 72a of the second inlet hole 72. This retains a pressure of the compressed air which has been supplied to the second inlet hole 72 at a set pressure, thereby allowing the second pressure switch (not shown) communicated with the second inlet hole 72 to sense that the detecting member 62 is at the unclamping position (E).

When clamp driving the clamp rod 5 upwards, the detecting member 62 at the unclamping position (E) in FIG. 8A ascends to a clamping position (F) in FIG. 8B. The first closing surface 87 of the detecting member 62 closes the first opening portion 71a of the first inlet hole 71. This retains a pressure of the compressed air which has been supplied to the first inlet hole 71 at the set pressure, thereby allowing the first pressure switch (not shown) communicated with the first inlet hole 71 to sense that the detecting member 62 is at the clamping position (F).

In FIG. 8A to FIG. 8C, characters (J), (K) and (L) indicate a clamping stroke, an additional stroke and a whole stroke, respectively.

At the time of clamp driving, in the case where the arm 6 (see FIG. 5) performed the vain-clamping due to misattachment of the work (W) (see FIG. 5) or the like, the detecting member 62 ascends to a vain-clamping position (G) in FIG. 8C. Then as shown by FIG. 8C, the first opening portion 71a of the first inlet hole 71 faces the first relief groove 88. Therefore, the compressed air which has been supplied to the inlet hole 71 is discharged to the exterior area through the first opening portion 71a, the first relief groove 88 and the outlet hole 60 (see FIG. 5). This lowers the pressure of the first inlet hole 71 than the set pressure, thereby allowing the first pressure switch (not shown) communicated with the first inlet hole 71 to sense that the detecting member 62 is at the vain-clamping position (G).

At the time of clamp driving, in the case where for any reason, the detecting member 62 does not ascend to the clamping position (F) in FIG. 8B and the first closing surface 87 has its upper end made lower than the first opening portion 71*a*, the compressed air which has been supplied to the first inlet hole 71 is discharged to the exterior area through the first opening portion 71*a*, the communication groove 86 and the outlet hole 60 (see FIG. 5). This lowers the pressure of the first inlet hole 71 than the set pressure, thereby allowing the first pressure switch (not shown) to sense that the detecting member 62 is not at the clamping position (F).

Further, when moving the detecting member 62 from the clamping position (F) in FIG. 8B to the unclamping position (E) in FIG. 8A, in the case where for any reason, the detecting member 62 does not descend to the unclamping position (E) in FIG. 8A and the second relief groove 90 faces the second opening portion 72*a*, the compressed air which has been supplied to the second inlet hole 72 is discharged to the exterior area through the second opening portion 72*a*, the second relief groove 90 and the outlet hole 60 (see FIG. 5). This lowers the pressure of the second inlet hole 72 than the set pressure, thereby allowing the second pressure switch (not shown) to sense that the detecting member 62 is not at the unclamping position (E).

The first and second embodiments offer the following advantages.

The clamp rod 5 has the projection (actuation portion) 5*a* connected to the detecting member 62 so that the projection 5*a* can make a relative movement radially. Therefore, the detecting member 62 can be assuredly and smoothly inserted into the detecting hole 58.

Incidentally, when a large bending moment acts on the clamp rod 5 at the time of clamp driving, the projection (actuation portion) 5*a* provided at the lower end portion of the clamp rod 5 bends although only slightly. In this case, since the projection 5*a* and the detecting member 62 are connected to each other so that they can make a relative movement radially, it is possible to prevent the bent projection 5*a* from pushing the detecting member 62 to the detecting hole 58. Thus the detecting member 62 smoothly moves through the detecting hole 58. This results in being able to surely and precisely detect the operation of the clamp rod 5.

In addition, the projection (actuation portion) 5*a* is connected to the detecting member 62 vertically movably as well, which results in further enhancing the above effect.

The above respective embodiments can be modified as follows.

A spring, rubber or the like resilient member may be interposed between the projection 5*a* of the clamp rod 5 and the detecting member 62. In this case, an urging force of the resilient member can return the detecting member 62 to its initial position, which results in the possibility of performing the operation detection of the clamp rod 5 with more assuredness.

A structure for connecting the projection 5*a* and the detecting member 62 to each other may utilize a snap ring and the like other kinds of connecting means instead of employing the exemplified support bolt 63.

It is a matter of course that as for the recess 69 and the closing surface 68, they are not limited to the exemplified shapes but various sorts of shapes are applicable.

It is preferable to constitute the inner cylinder 57 provided with the first inlet hole 71 and the second inlet hole 72 (see FIG. 2A) as well as the cylinder member 81 (see FIG. 6) so that each of them can be adjusted vertically in position and can be adjusted in rotation around the axis. Additionally, it is preferable to construct the detecting member 62 so that its height can be adjusted vertically with respect to the projection (actuation portion) 5*a*.

As for the first inlet hole 71 and the second inlet hole 72, only one of them may be provided instead of providing both of them.

The fluid which is supplied to and discharged from the clamping chamber 17 and the unclamping chamber 19 may be other kinds of liquid and air or the like gas instead of the pressurized oil.

The clamp 2 may be of single-acting type instead of double-acting type. In this event, there are considered two cases. In one case, the clamp 2 is driven for clamping with pressurized fluid. And in the other case, it is driven for clamping by a spring force.

What is claimed is:

1. A device for detecting operation of a clamp, the device comprising:

- a housing (3) having one end wall (3*b*);
- a clamp rod (5) having one end portion and axially movably inserted into the housing (3);
- a detecting hole (58) having a peripheral surface and formed in the one end wall (3*b*) of the housing (3) substantially concentrically with the clamp rod (5);
- at least one inlet hole (71, 72) supplying pressurized fluid to the detecting hole (58) and
- having an opening portion (71*a*, 72*a*) provided by opening the peripheral surface of the detecting hole (58);
- a detecting member (62) having an outer peripheral surface and axially movably fitted into the detecting hole (58), the detecting member (62) having the outer peripheral surface provided with a closing surface (68) which closes the opening portion (71*a*, 72*a*) and with a recess (69) which communicates the opening portion (71*a*, 72*a*) with the outside air; and
- an actuation portion (5*a*) provided at the one end portion of the clamp rod (5), the actuation portion (5*a*) being connected to the detecting member (62) 50 that it makes a relative movement radially.

2. The device for detecting operation of a clamp as set forth in claim 1, wherein the actuation portion (5*a*) is connected to the detecting member (62) so that it makes a relative movement axially.

3. The device for detecting operation of a clamp as set forth in claim 2, wherein the actuation portion (5*a*) is connected to the detecting member (62) so that it is inhibited from making a relative rotation around the axis.

4. The device for detecting operation of a clamp as set forth in claim 2, wherein

- the detecting hole (58) has one end, and the detecting member (62) has one end surface and the other end surface, the recess (69) of the detecting member (62) having one end and the other end,
- the one end of the detecting hole (58) being communicated with the outside air, the recess (69) being defined by a groove extending axially, the recess (69) composed of the groove having the one end opened to the one end surface of the detecting member (62) and the other end opened to the other end surface of the detecting member (62).

5. The device for operation of a clamp as set forth in claim 1, wherein the actuation portion (5*a*) is connected to the detecting member (62) so that it is inhibited from making a relative rotation axis.

6. The device for detecting operation of a clamp as set forth in claim 3, wherein the detecting hole (58) has one end, and the detecting member (62) has one end surface and the other end surface, the recess (69) of the detecting member (62) having one end and the other end, the one end of the detecting hole (58) being communicated with the outside air, the recess (69) being defined by a groove extending axially, the recess (69) composed of the groove having the one end opened to the one end surface of the detecting member (62) and the other end opened to the other end surface of the detecting member (62).

7. The device for detecting operation of a clamp as set forth in claim 1, wherein the detecting hole (58) has one end, and the detecting member (62) has one end surface and the other end surface, the recess (69) of the detecting member (62) having one end and the other end, the one end of the detecting hole (58) being communicated with the outside air, the recess (69) being defined by a groove extending axially, the recess (69) composed of the groove having the one end opened to the one end surface of the detecting member (62) and the other end opened to the other end surface of the detecting member (62).

* * * * *